United States Patent [19]
Horiguchi et al.

[11] Patent Number: 6,066,930
[45] Date of Patent: *May 23, 2000

[54] SYNCHRONOUS DRIVING METHOD FOR INDUCTIVE LOAD AND SYNCHRONOUS CONTROLLER FOR H-BRIDGE CIRCUIT

[75] Inventors: Kenji Horiguchi; Tomoaki Nishi, both of Hanno, Japan

[73] Assignee: Shindengen Electric Manufacturing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/910,400

[22] Filed: Aug. 13, 1997

[30] Foreign Application Priority Data

Sep. 3, 1996 [JP] Japan .................................. 8-252451

[51] Int. Cl.$^7$ ........................................... H02P 7/00
[52] U.S. Cl. .......................................... 318/439; 318/492
[58] Field of Search ..................... 318/439, 254, 318/138, 282–286, 492, 376

[56] References Cited

U.S. PATENT DOCUMENTS

| | | | |
|---|---|---|---|
| 4,368,411 | 1/1983 | Kidd | 318/254 |
| 4,528,486 | 7/1985 | Flaig et al. | 318/254 |
| 5,032,780 | 7/1991 | Hopkins . | |
| 5,578,911 | 11/1996 | Carter et al. | 318/376 |
| 5,602,452 | 2/1997 | Underhill | 318/439 |
| 5,703,456 | 12/1997 | Cox | 318/701 |

FOREIGN PATENT DOCUMENTS

| | | |
|---|---|---|
| 0196543 | 3/1986 | European Pat. Off. . |
| 07039194 | 2/1995 | Japan . |

OTHER PUBLICATIONS

Ericsson, "Integrated Circuits Data Book," Sep. 1988, pp. 6–36 to 6–43 and 6–52 to 6–61.

*Primary Examiner*—Jonathan Wysocki
*Attorney, Agent, or Firm*—Stevens, Davis, Miller & Mosher, L.L.P.

[57] ABSTRACT

In flowing a switching current through an inductive load by way of an H-bridge circuit, a control circuit and a timing signal generating circuit are used to start a current supply operation in accordance with a driving period of a predetermined frequency, thereby increasing the current flowing through the inductive load. In reducing the current, a power source regeneration operation is performed during a power source regeneration period and a commutation operation is performed during a commutation period. The power source regeneration operation and the commutation operation are well balanced with each other, thereby making it possible to perform a high-frequency driving with a switching current having less ripple. Also, since the power source regeneration operation is performed in a long time in the case where the switching current level is reduced, it becomes possible to quickly reduce the current level down to a desired level.

16 Claims, 6 Drawing Sheets

SYNCHRONOUS DRIVING METHOD FOR INDUCTIVE LOAD AND SYNCHRONOUS CONTROLLER FOR H-BRIDGE CIRCUIT

BACKGROUND OF THE INVENTION

1. Field of the Invention

The present invention relates to a technique of driving an inductive load by use of semiconductor switching elements, and more particularly to an inductive load driving method in which an H-bridge is formed to drive an inductive load and an inductive load driving apparatus which realizes such a method.

2. Description of the Related Art

In general, a stepping motor is constructed such that it has a rotor including a rotatable moving magnet and a plurality of driving coils each including an electromagnet are arranged around the rotor. In the stepping motor, the position and the rotating speed of the rotor can be controlled in an open loop by selecting the driving coils to cause the flow of a pulse-like current having a predetermined amplitude. In recent years, therefore, the stepping motors have widely been used as convenient motors.

In general, the stepping motor is an inductive load. As methods for driving such a load, there have widely been used a uni-polar driving method in which a current is flown in a fixed direction and a bi-polar driving system in which a current can be flown in either a forward direction or a reverse direction. In order that a switching current having a constant amplitude is caused to flow through the inductive load, each driving method is such that when a current supplied from a power source becomes equal to or larger than a predetermined value, a current is caused to flow through the flywheel diode connected in reverse parallel to the semiconductor switching element to release an energy stored in the inductive load, thereby attenuating the current flowing through the inductive load.

An example of such an inductive load driving method is shown in FIG. 5.

In FIG. 5, reference numeral 102 denotes an inductive load driving apparatus according to the prior art in which an H-bridge circuit is formed by an inductive load 131 in a stepping motor and four transistors 111 to 114. The upper transistors 111 and 112 are connected to a power source 132, and the lower transistors 114 and 113 are connected to a ground potential through a current detecting resistor 133.

Flywheel diodes 121 and 122 are connected in reverse parallel to the upper transistors 111 and 112, respectively. Similarly, flywheel diodes 123 and 124 are respectively connected in reverse parallel to the lower transistors 113 and 114 across the transistors 113 and 114 and the current detecting resistor 133.

The base terminals of the transistors 111 to 114 are connected to a control circuit 134 so that the operation of the transistor is controlled by the control circuit 134. Now assume that the transistors 111 and 113 are in turned-on conditions while the transistors 112 and 114 are in turned-off conditions. In this state, a supply current is supplied from the power source 132 to the inductive load 131 in a direction indicated by reference numeral 141.

The supply current 141 flows through the current detecting resistor 133. When a voltage generated across the current detecting resistor 133 becomes larger than a reference voltage 136, the output of a comparator 135 is inverted and the control circuit 134 detects the inversion of the comparator output to stop the supply current 141, thereby attenuating the current flowing through inductive load 131. After the lapse of a predetermined time, the control circuit 134 causes the flow of the supply current 141 from the power source 132 to the inductive load 131 again and stops the supply current 141 in accordance with the inversion of an output signal of the comparator 135. With the repetition of such an operation, a switching current flowing through the inductive load 131 can maintain a predetermined level.

There are two kinds of methods in the case where the control circuit 134 stops the supply current 141 from the power source 132 to attenuate the current flowing through the inductive load 131.

In one method, all of the transistors 111 to 114 are brought into turned-off conditions. At this time, the flywheel diodes 124 and 122 are reversely biased owing to an electromotive force generated in the inductive load 131 to cause the flow of a regeneration current indicated by reference numeral 142 in FIG. 6A. The flow of the regeneration current 142 causes the charging of (an output condenser of) the power source 132 so that a current flowing through the inductive load 131 is attenuated. In this case, it is possible to effectively utilize an energy stored in the inductive load 131.

In the other method, one of the transistors 111 and 113 is turned off. Now assume that in a state in which the supply current 141 is flowing, the transistor 111 is turned off with the transistor 113 being kept as it was turned on. Then, the flywheel diode 124 is forwardly biased owing to a reverse electromotive force of the inductive load 131 to cause the flow of a commutation current indicated by reference numeral 143 in FIG. 6B. The flow of the commutation current 143 causes the generation of heat from the flywheel diode 124 and the transistor 113 so that an energy stored in the inductive load 131 is consumed to attenuate the current. In this case, it is not possible to utilize the energy stored in the inductive load 131.

Comparing the regeneration current 142 and the commutation current 143, the regeneration current 142 can make the quick attenuation of a current flowing through the inductive load 131 at the time of switching of the current flowing through the inductive load 131 whereas the commutation current 143 can make the slow attenuation thereof.

However, in the case where the release of an energy stored in the inductive load 131 is tried in accordance with either one of the two methods mentioned above, a way based on the regeneration current 142 has a demerit that the attenuation is too rapid with the result that the ripple of the switching current flowing through the inductive load 131 is too large. On the other hand, a way based on the commutation current 143 has a demerit that the attenuation is too gentle with the result that the followability in changing a switching current level flowing through the inductive load 131 is poor. Also, when the driving by a switching current is tried in the case where there are a plurality of above-mentioned inductive loads 131 as in a two-phase stepping motor, there is a problem that in the case where frequencies for controlling respective currents flowing through the plurality of inductive loads are close to each other, beats are generated with the result that noises or vibrations become large.

SUMMARY OF THE INVENTION

The present invention is made in order to solve the above-mentioned inconveniences of the prior art and aims at the provision of a technique with which a switching current flowing through an inductive load can be controlled to the optimum by combining a regeneration current and a commutation current.

Another object of the present invention is to provide a technique with which switching currents flowing through a plurality of inductive loads can be controlled to the optimum.

To solve the above problems, according to one aspect of the present invention, there is provided an inductive load driving method for controlling a current flowing an inductive load, said current being supplied in both forward and reverse directions by an H-bridge circuit including four semiconductor switching elements and flywheel diodes respectively connected to said semiconductor switching elements, said inductive load driving method comprising at least two of a current supplying step of turning two of said semiconductor switching elements on so as to supply a current from a power source to said inductive load; a commutation step of turning one of said semiconductor switching elements on so that energy stored in said inductive load causes a current flowing through said one of said semiconductor switching elements and one of said flywheel diodes; and a power source regeneration step of turning all of said semiconductor switching elements off so that energy stored in said inductive load causes a current flowing through two of said flywheel diodes; wherein said inductive load driving method further comprises the step of generating a timing signal having a predetermined frequency and indicative of a driving period to (i) start said current supplying step in accordance with a start of said driving period and stop said current supplying step hen an amplitude of the current flowing though said inductive load becomes a predetermined value or more, (ii) start said power source regeneration step when said current supplying step is stopped before a predetermined time point and stop said power source regeneration step at said predetermined time period, and (iii) start said commutation step when said current supplying step or said current supplying step is stopped and stop said commutation step at an end of said driving period.

Further, according to one aspect of the present invention, there is provided an inductive load driving apparatus comprising: an H-bridge circuit, including four semiconductor switching elements and flywheel diodes respectively connected to said semiconductor switching elements, for supplying a current in both forward and reverse directions through said inductive load; a control circuit for controlling said H-bridge circuit to perform at least two of (i) a current supplying operation of turning two of said semiconductor switching elements on so as to supply a current from a power source to said inductive load, (ii) a power source regeneration operation of turning one of said semiconductor switching elements on so that energy stored in said inductive load causes a current flowing through said one of said semiconductor switching elements and one of said flywheel diodes, and (iii) a commutation operation of turning all of said semiconductor switching elements off so that energy stored in said inductive load causes a current flowing through two of said flywheel diodes; and a timing signal generating circuit for generating a timing signal having a predetermined frequency and indicative of a driving period so that said control circuit controls said H-bridge circuit to (i) start said current supplying operation in accordance with a start of said driving period and stop said current supplying operation when an amplitude of the current flowing though said inductive load becomes a predetermined value or more, (ii) start said power source regeneration operation when said current supplying operation is stopped before a predetermined time point and stop said power source regeneration operation at said predetermined time period, and (iii) start said commutation operation when said current supplying operation or said current supplying operation is stopped and stop said commutation operation at an end of said driving period.

DESCRIPTION OF THE PREFERRED EMBODIMENTS

Embodiments of an inventive apparatus will be described together with an inventive method by use of the drawings.

Figure 1:
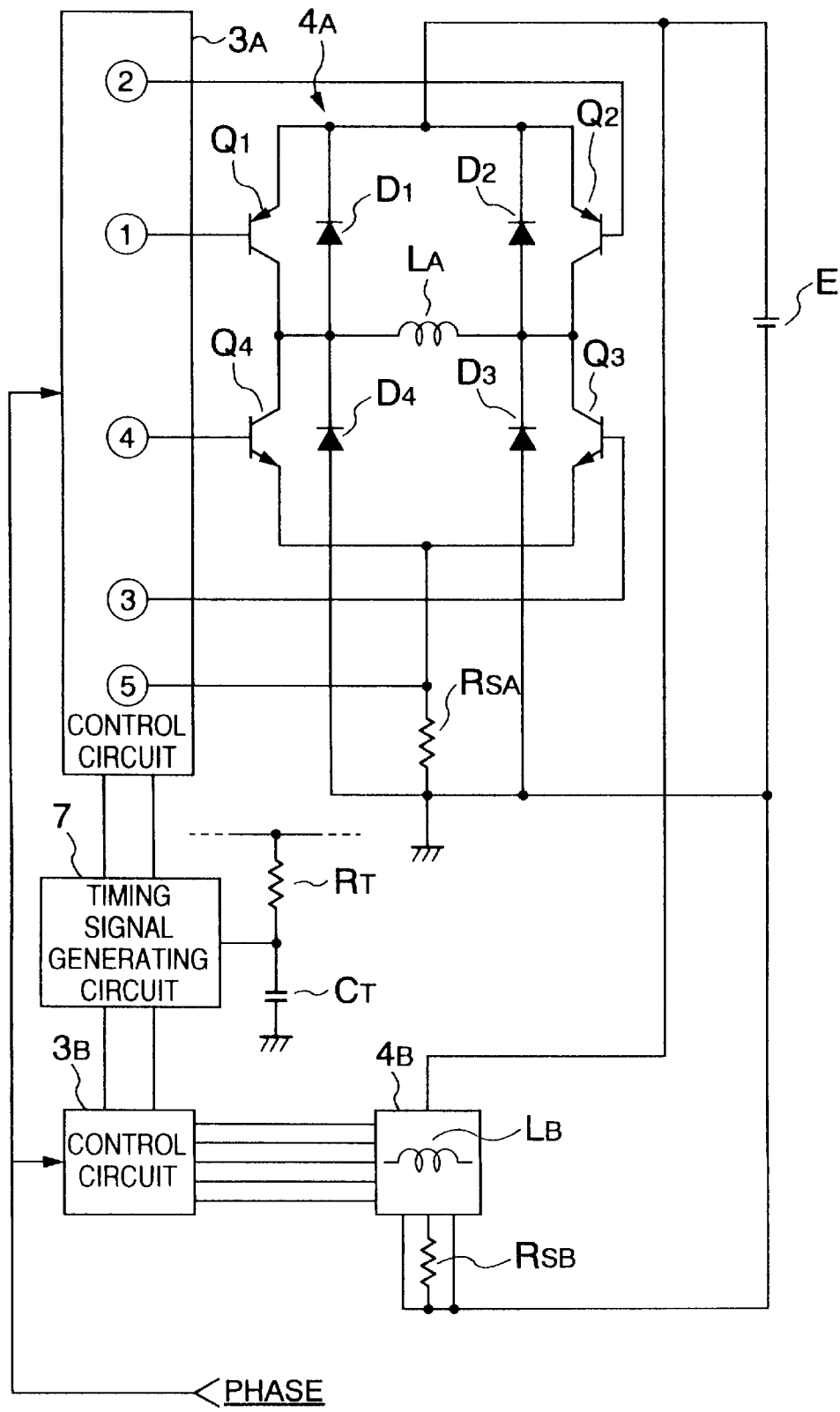
FIG. 1 is a block diagram showing the whole of an inductive load driving apparatus according to the present invention.

Referring to FIG. 1, reference numeral 2 denotes an example of an inductive load driving apparatus of the present invention for driving a two-phase stepping motor. It is assumed that an A-phase stepping motor is represented by an inductive load $L_A$ and a B-phase stepping motor is represented by an inductive load $L_B$.

This inductive load driving apparatus 2 includes an H-bridge circuit $4_A$ in which the inductive load $L_A$ is connected, an H-bridge circuit $4_B$ in which the inductive load $L_B$ is connected, control circuits $3_A$ and $3_B$ which control the H-bridge circuits $4_A$ and $4_B$, respectively, and a timing signal generating circuit 7. The H-bridge circuits $4_A$ and $4_B$, the control circuits $3_A$ and $3_B$ and the timing signal generating circuit 7 are formed as an IC structure on the same semiconductor substrate.

Two current detecting resistors $R_{SA}$ and $R_{SB}$, a timing resistor $R_T$ and a timing condenser $C_T$ as externally mounted parts constructed by discrete parts are connected to the inductive load driving apparatus. A series-connected circuit of the timing resistor $R_T$ and the timing condenser $C_T$ is connected between a power source voltage and a ground potential, and a voltage generated across the timing condenser $C_T$ is inputted to the timing signal generating circuit 7. Also, a signal outputted by the timing signal generating circuit 7 is inputted to the control circuit $3_A$ and the control circuit $3_B$. The control circuits $3_A$ and $3_B$ are connected to the H-bridge circuits $4_A$ and $4_B$, respectively. With this construction, the inductive loads $L_A$ and $L_B$ are driven.

The internal constructions of the H-bridge circuit $4_A$ and the H-bridge circuit $4_B$ are similar to each other. Also, the structures of the control circuit $3_A$ and the control circuit $3_B$ are similar to each other. Therefore, explanation will be made of the timing signal generating circuit 7, the control circuit $3_A$ which operates in accordance with a driving frequency generated by the timing signal generating circuit 7, and the A-phase stepping motor driving H-bridge circuit 4A which is controlled by the control circuit $3_A$ while the explanation of the structures of the control circuit $3_B$ and the H-bridge circuit $4_B$ for B phase will be omitted.

The H-bridge circuit $4_A$ includes transistors $Q_1$ to $Q_4$ which are semiconductor switching elements. The transistors $Q_1$ to $Q_4$, flywheel diodes $D_1$ to $D_4$ and the control circuit 3 are formed on one semiconductor substrate. Two PNP transistors $Q_1$ and $Q_2$ are connected on the power source voltage side of a power source E, and two NPN transistors $Q_3$ and $Q_4$ are connected on the ground potential side. Also, the PNP transistor $Q_1$ and the NPN transistor $Q_4$ are connected in series with each other while the PNP transistor $Q_2$ and the NPN transistor $Q_3$ are connected in series with each other. With this construction, an H-bridge circuit can be formed by connecting the A-phase inductive load $L_A$ between the connected points of these series-connected circuits of the transistors.

The above-mentioned current detecting resistor $R_{SA}$ is inserted between the NPN transistors $Q_3$ and $Q_4$ and the ground potential. The flywheel diodes $D_3$ and $D_4$ are respectively connected in reverse parallel to the NPN transistors $Q_3$ and $Q_4$ through the current detecting resistor $R_{SA}$. Also, the flywheel diodes $D_1$ and $D_2$ are directly connected in reverse parallel to the PNP transistors $Q_1$ and $Q_2$, respectively.

The base terminals (①) to (④) of the transistors $Q_1$ to Q4 and a voltage output portion ((⑤)) of the current detecting resistor $R_{SA}$ are connected to the control circuit $3_A$. With this construction, when a current is supplied from the power source E to the inductive load LA, the control circuit $3_A$ brings any one of a set of the transistors $Q_1$ and $Q_3$ and a set of the transistors $Q_2$ and $Q_4$ into turned-on conditions in accordance with a PHASE signal inputted from the exterior to cause the flow of a current through the inductive load LA in a predetermined direction.

At that time, the current supplied from the power source E to the inductive load $L_A$ flows through the current detecting resistor $R_{SA}$ so that a voltage corresponding to the amplitude of the current is generated. This voltage is detected to control a current flowing through the inductive load $L_A$.

Figure 2:
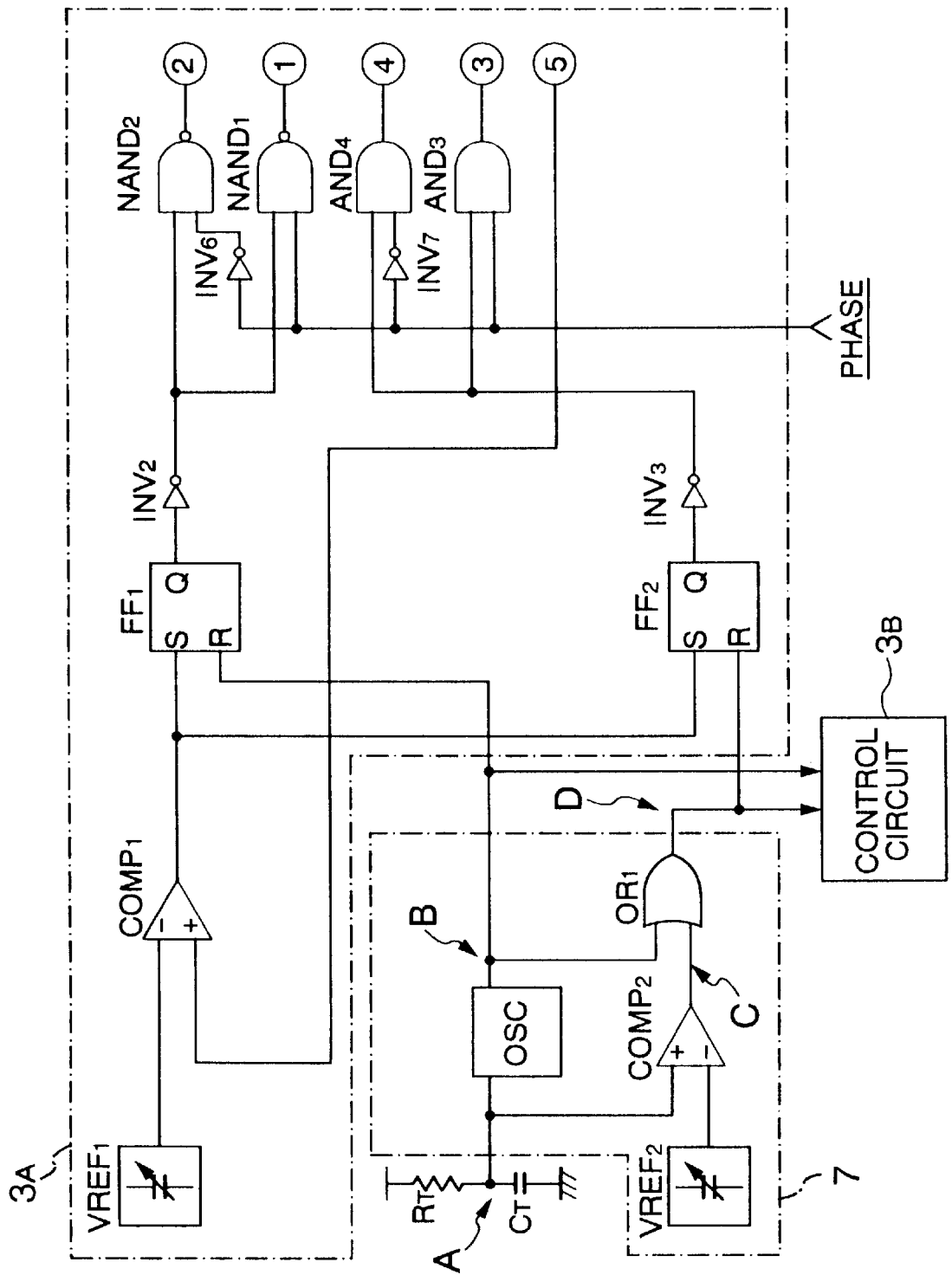
FIG. 2 shows the internal block of a control circuit and a timing signal generating circuit of the inductive load driving apparatus of the present invention.

The internal block of the control circuit $3_A$ is shown in FIG. 2.

Referring to FIG. 2, the control circuit $3_A$ includes 2-input $NAND_1$ and $NAND_2$ and 2-input $AND_3$ and $AND_4$.

The respective output terminals ((①), (②)) of the $NAND_1$ and $NAND_2$ are connected to the base terminals of the transistors $Q_1$ and $Q_2$, and the respective output terminals ((③), (④)) of the $AND_3$ and $AND_4$ are connected to the base terminals of the transistors $Q_3$ and $Q_4$.

The above-mentioned PHASE signal inputted from the exterior is connected to the input terminals of the $NAND_1$ and $AND_3$, as it is. On the other hand, the PHASE signal is connected to the input terminals of the $NAND_2$ and $AND_4$ through inverters $INV_6$ and $INV_7$, respectively. Thereby, when the PHASE signal is high, the set of the transistors $Q_2$ and $Q_4$ are placed into a condition in which they cannot be turned on whereas when the PHASE signal is low, the set of the transistors $Q_1$ and $Q_3$ are placed into a condition in which they cannot be turned on. Accordingly, there are neither the simultaneous turn-on of the transistor $Q_1$ and the transistor $Q_4$ nor the simultaneous turn-on of the transistor $Q_2$ and the transistor $Q_3$. Namely, a control is made so that a through current flowing between the power source E and the ground potential without passing through the inductive load $L_A$ is not generated.

It is now assumed that the PHASE signal takes a high condition so that the turn-on of the transistors $Q_2$ and $Q_4$ is inhibited. In this state, the output conditions of the $NAND_1$ and $AND_3$ change in accordance with signals other than the PHASE signal, thereby controlling the transistors $Q_1$ and $Q_3$.

The control circuit $3_A$ has a reference power source $VREF_1$ for current comparison. The output of the reference $VREF_1$ and the output ((⑤)) of the current detecting resistor $R_{SA}$ are inputted to an inverted input terminal and a non-inverted input terminal of a comparator $COMP_1$, respectively, and an output terminal of the $COMP_1$ is connected to the set terminal S of each of flip-flops $FF_1$ and $FF_2$.

An output terminal Q of the $FF_1$ is connected to the input terminals of the $NAND_1$ and $NAND_2$ through an $INV_2$, and an output terminal Q of the $FF_2$ is connected to the input terminals of the $AND_3$ and $_4$ through an $INV_3$.

The truth table of the $FF_1$ and $FF_2$ is shown in the following Table 1.

TABLE 1

| TRUTH TABLE OF $FF_1$ AND $FF_2$ | | |
|---|---|---|
| S | R | Q |
| High | High | Low |
| High | Low | High |
| Low | High | Low |
| Low | Low | Low |

The $FF_1$ and $FF_2$ are constructed such that in a state in which the reset terminal R assumes a high condition, the output terminal Q takes a low condition irrespective of the condition of the set terminal S.

Now provided that the output voltage of the current detecting resistor $R_{SA}$ is below the output voltage of the reference power source $VREF_1$, the output of the above-mentioned $COMP_1$ is low and hence the set terminals S of the $FF_1$ and $FF_2$ takes low conditions. Accordingly, the output terminals Q of the $FF_1$ and $FF_2$ are low. These low outputs are respectively inverted by the $INV_2$ and $INV_3$ so that the inverted high outputs are inputted to the $NAND_1$ and $NAND_7$ and the $AND_3$ and $AND_4$, respectively.

At this time, since the PHASE signal assumes a high condition, the output of the $NAND_1$ is low and the output of the $AND_3$ is high. Therefore, the transistors $Q_1$ and $Q_3$ are both brought into turned-on conditions.

Thus, in the case where the voltage generated across the current detecting resistor $R_{SA}$ is lower than the output voltage of the $VREF_1$ so that the output of the $COMP_1$ is low and hence the output terminals Q of the $FF_1$ and $FF_2$ take low conditions, the transistors $Q_1$ and $Q_3$ are turned on so that a current is supplied from the power source E to the inductive load $L_A$.

When the voltage supplied from the power source E increases so that the voltage generated across the current detecting resistor $R_{SA}$ exceeds the output voltage of the $VREF_1$, the output of the $COMP_1$ is inverted from the low condition to a high condition. Thereby, the set terminals S of the $FF_1$ and $FF_2$ turn into high conditions.

As shown in Table 1 mentioned above, the $FF_1$ and $FF_2$ are constructed such that the condition of the output terminal Q can be controlled in accordance with the condition of the reset terminal R even if the set terminal S takes a high condition. The reset terminals R of the $FF_1$ and $FF_2$ are connected to the output terminals of the timing signal generating circuit 7. As a result, the output terminals Q of the $FF_1$ and $FF_2$ are controlled by the timing signal generating circuit 7 when the output of the $COMP_1$ is high.

Explaining the internal block of the timing signal generating circuit 7, the timing signal generating circuit 7 has an oscillator OSC, a comparator $COMP_2$, a reference power source $VREF_2$ and an $OR_1$ and a connection is made such that the voltage of the above-mentioned timing condenser $C_T$ is inputted to the OSC.

Figure 3:
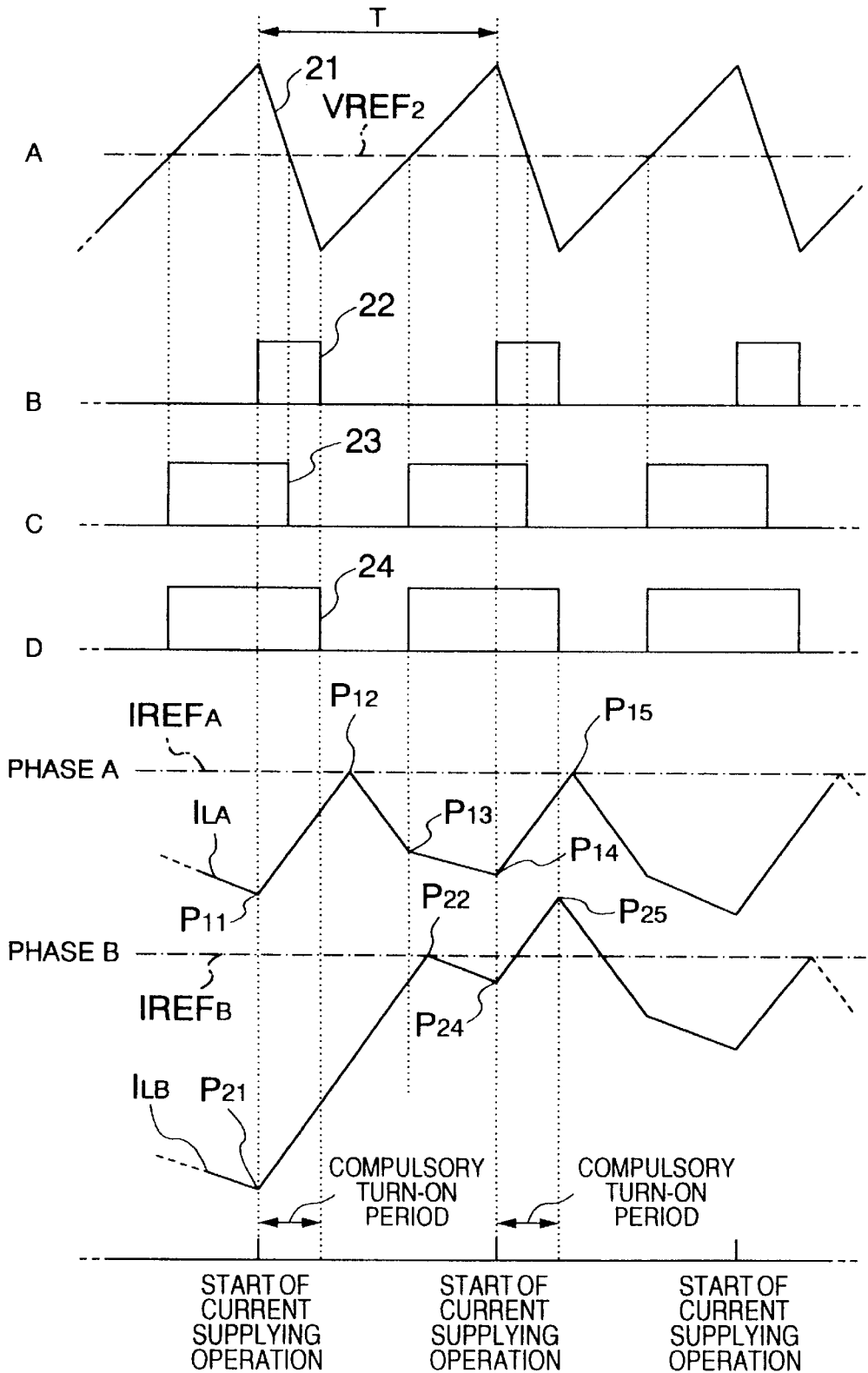
FIG. 3 is a timing chart for explaining the operation of the inductive load driving apparatus of the present invention.

The OSC has a circuit incorporated therein for charging and discharging the timing condenser $C_T$. With the operation of this circuit, a sawtooth wave oscillating at a fixed period as shown by reference numeral 21 in FIG. 3 is formed by the timing condenser $C_T$ (at a wiring portion indicated by reference symbol A). One period of the sawtooth wave 21 is defined as a driving period T.

The OSC waveform-shapes the sawtooth wave 21 to generate a rectangular wave 22 which is low during a time when the voltage of the sawtooth wave 21 increases and high during a time when the voltage of the sawtooth wave 21 decreases. The generated rectangular wave 22 is outputted from the OSC (at a wiring portion indicated by reference symbol B) to the control circuit $3_A$ (and the control circuit $3_B$) and one input terminal of the $OR_1$.

The sawtooth wave 21 is also outputted to a non-inverted terminal of the $COMP_2$, and an inverted terminal of the $COMP_2$ is inputted with a reference voltage outputted by the reference power source $VREF_2$. The $COMP_2$ compares the inputted sawtooth wave 21 and the reference voltage to generate a rectangular wave 23 which is high when the sawtooth wave 21 is larger than the output voltage of $VREF_2$ and low when the former is smaller than the latter. The generated rectangular wave 23 is outputted from the $COMP_2$ to the other input terminal of the $OR_1$ (at a wiring portion indicated by reference symbol C).

The $OR_1$ inputted with the rectangular wave 23 and the rectangular wave 24 performs the operation of addition of the rectangular waves 23 and 24 to generate a rectangular wave 24 which is in turn outputted to the control circuit $3_A$ and the control circuit $3_B$ (at a wiring portion indicated by reference symbol D).

In this manner, the rectangular waves 22 to 24 are generated from the waveform of the sawtooth wave 21 and by the comparison of the sawtooth wave 21 and the output voltage of the $VREF_2$. The oscillating period of each of the rectangular waves 22 to 24 is the driving period T.

The above-mentioned rectangular wave 22 and rectangular wave 24 are respectively inputted to the reset terminals R of the $FF_1$ and $FF_2$ in the control circuit $3_A$ (and the control circuit $3_B$), and the conditions of the set terminals S of the $FF_1$ and $FF_2$ are changed in accordance with the output of the $COMP_1$.

The conditions of the output terminals Q of the $FF_1$ and $FF_2$ and the conditions of the transistors $Q_1$ and $Q_3$ have a relationship shown in the following Table 2.

TABLE 2

CONDITIONS OF OUTPUT TERMINALS Q OF
$FF_1$ AND $FF_2$ AND TRANSISTORS $Q_1$ AND $Q_3$

| $FF_1$ | $FF_2$ | $Q_1$ | $Q_3$ | OPERATING STATE |
|---|---|---|---|---|
| High | High | Off | Off | POWER SOURCE REGENERATION OPERATION |

TABLE 2-continued

CONDITIONS OF OUTPUT TERMINALS Q OF
$FF_1$ AND $FF_2$ AND TRANSISTORS $Q_1$ AND $Q_3$

| $FF_1$ | $FF_2$ | $Q_1$ | $Q_3$ | OPERATING STATE |
|---|---|---|---|---|
| High | Low | Off | On | COMMUTATION OPERATION |
| Low | High | On | Off | COMMUTATION OPERATION* |
| Low | Low | On | On | ELECTRIC CURRENT SUPPLY OPERATION |

*STATE OF $Q_1$ = ON AND $Q_3$ = OFF IS NOT GENERATED IN THIS CONTROL CIRCUIT)

As a result, the transistors $Q_1$ and $Q_3$ are controlled by the $COMP_2$ and the timing signal generating circuit 7 through the $FF_1$ and $FF_2$.

The internal operation of the timing signal generating circuit 7 and the operations of the transistors $Q_1$ and $Q_3$ will now be explained in association with each other. First, during a time when the voltage of the sawtooth wave 21 is decreasing, the rectangular waves 22 and 24 are both high. Accordingly, the reset terminals R of the $FF_1$ and $FF_2$ take high conditions and hence both of the output terminals Q thereof take low conditions.

When the output terminals Q of the $FF_1$ and $FF_2$ are both placed in the low conditions, the transistors $Q_1$ and $Q_3$ are both turned on so that there is performed a current supply operation in which a current is supplied from the power source E to the inductive load $L_A$.

If the reset terminal R takes the high condition, the output terminal Q takes the low condition irrespective of the condition of the set terminal S. Therefore, during the time when the rectangular wave 22 is high, the output terminals Q of the $FF_1$ and $FF_2$ take the low conditions irrespective of whether the condition of the output signal of the $COMP_1$ is high or low, that is, in either the case where a voltage generated across the current detecting resistor $R_{SA}$ exceeds the output voltage of the $VREF_1$ or the case where the former voltage is below the latter voltage. As a result, the turned-on conditions of the transistors $Q_1$ and $Q_3$ are kept.

Provided that a period of time when the rectangular wave 22 is high is called a "compulsory turn-on period", the forced turn-on period corresponds to a period of time when the voltage of the sawtooth wave 21 attenuates. Also, the forced turn-on period corresponds to an initial stage of start of the current supply operation. When the current supply operation is started, there is the case where noises are generated by a through current which may flow in a reverse recovery time of the flywheel diode $D_1$ or $D_2$ or a through current which may flow due to a capacitance component of the inductive load LA. However, the initial period of start of the current supply operation is taken as the forced turn-on period, thereby ignoring the output of the $COMP_1$. Therefore, even in the case where the output of the $COMP_1$ is inverted by the noises, there is no fear that an erroneous operation of erroneously stopping the current supply operation is generated.

When the forced turn-on period is completed, the rectangular wave 22 and the rectangular wave 24 turn into low conditions and hence the reset terminals R of the $FF_1$ and $FF_2$ are brought into low conditions. The condition of the output terminal Q of the $FF_1$ or $FF_2$ is determined in accordance with the condition of the set terminal S when the condition of the reset terminal R is low. Accordingly, in the case where the output of the $COMP_1$ has taken a high condition as the result of the increase of a current supplied from the power source E in the compulsory turn-on period, the output terminals Q of the $FF_1$ and $FF_2$ immediately turn into high conditions, thereby bringing the transistors $Q_1$ and $Q_3$ into turned-off conditions.

On the other hand, in the case where the output of the $COMP_1$ is low at a point of time when the compulsory turn-on period is completed, the conditions of the output terminals Q of the $FF_1$ and $FF_2$ remain as they were low and the transistors $Q_1$ and $Q_3$ maintain the turned-on conditions. In time, however, the current supplied from the power source E to the inductive load $L_A$ increases so that the output of the $COMP_1$ is inverted.

In this case, since the condition of the rectangular wave 22 is low and hence the condition of the reset terminal R of the $FF_1$ is low, the output terminal Q of the $FF_1$ turns into a high condition in accordance with the inversion of the output of the $COMP_1$, thereby turning the transistor $Q_1$ off. But, a state of the reset terminal R of the $FF_2$ differs in accordance with the condition of the rectangular wave 24.

Assume that a period of time from the start of a compulsory turn-on period until the turn of the rectangular wave 24 from a low condition into a high condition is called a power source regeneration period and a period of time from the turn of the rectangular wave 24 into the high condition until the start of a forced turn-on period in the next driving period T is called a commutation period. In the case where the output of the $COMP_1$ is inverted in the power source regeneration period, the output terminal Q of the $FF_2$ turns from a low condition into a high condition and hence the transistor $Q_3$ is also turned off so that a power source regeneration operation is started. When a commutation period is started after the power regeneration period is completed, the transistor $Q_3$ is turned on again so that the power source regeneration operation transfers to a commutation operation.

Then, a current is supplied from the power source E to the inductive load $L_A$ by virtue of a current supply operation. Thus, the power source regeneration operation and the commutation operation are performed in a well-balanced manner.

In this way, the operation differs in accordance with whether the point of time of inversion of the output of the $COMP_1$ is in the power source regeneration period or in the commutation period. Therefore, more detailed explanation will be made by use of FIG. 3 with the A and B phases of the two-phase stepping motor being applied to the former and latter cases, respectively. Herein, it is assumed that currents flowing through the A-phase and B-phase inductive loads $L_A$ and $L_B$ are $L_{LA}$ and $I_{LD}$ respectively and the values of the output voltages of the $VREF_1$'s in the control circuits $3_A$ and $3_B$ reduced to current values are $IREF_A$ and $IREF_B$ respectively.

First, it is assumed that the currents flowing through the inductive loads $L_A$ and $L_B$ begin to increase at a point (P11 or P21) of time of turn of the rectangular wave 22 from a low condition into a high condition, and the current $I_{LA}$ flowing through the A-phase inductive load $L_A$ reaches the upper limit current $IREF_A$ (or a current having an amplitude with which the $COMP_2$ is inverted) at a point $P_{12}$ in a power source regeneration period when the condition of the rectangular wave 24 is low whereas the current $I_{LB}$ flowing through the B-phase inductive load $L_B$ reaches the upper limit current $IREF_B$ at a point $P_{22}$ in a commutation period when the condition of the rectangular wave 24 is high.

In such circumstances, the output of the COMP in the control circuit $3_A$ is first inverted from a low condition to a high condition at the point of time P12 when the current $I_{LA}$ flowing through the inductive load $L_A$ reaches $IREF_A$. Thereby, the set terminals S of the $FF_1$ and $FF_2$ in the control circuit $3_A$ turn into a high condition. In the power source regeneration period, the reset terminals R of the $FF_1$ and $FF_2$ in the control circuit $3_A$ (and the control circuit $3_B$) assume low conditions. Therefore, at the point of time when the set terminal S turns into the high condition, the output terminal Q turns from a low condition into a high condition so that the transistors $Q_1$ and $Q_3$ in the H-bridge circuit $4_A$ are both brought into turned-off conditions.

At this time, the flywheel diodes $D_4$ and $D_2$ in the H-bridge circuit $4_A$ are forwardly biased owing to an electromotive force generated in the inductive load $L_A$ so that a regeneration current flows from the ground potential side toward the power source E through the two flywheel diodes $D_4$ and $D_2$. In such a power source regeneration operation, an energy stored in the inductive load $L_A$ transfers to the power source E, thereby effectively utilizing the energy stored in the inductive load $L_A$.

Since the anode of the flywheel diode $D_4$ is connected to the ground potential, the regeneration current flowing through the inductive load $L_A$ during the power source regeneration operation does not pass through the current detecting resistor $R_{SA}$. Accordingly, during the power source regeneration period, zero (V) is inputted to the non-inverted input terminal of the $COMP_1$ in the control circuit $3_A$ and the output of the $COMP_1$ takes a low condition. However, the conditions of the reset terminals R of the $FF_1$ and $FF_2$ remain as they were low and hence the $FF_1$ and $FF_2$ maintain the original conditions until they are reset by the turn of the reset terminal R into a high condition. Therefore, the conditions of the output terminals Q of the $FF_1$ and $FF_2$ in the control circuit $3_A$ remain as they were high so that the transistors $Q_1$ and $Q_3$ maintain the turned-off conditions.

In such a power source regeneration operation, the current $I_{LA}$ flowing through the inductive load $L_A$ rapidly decreases but the $FF_2$ in the control circuit $3_A$ is reset when the rectangular wave 24 turns from a low condition into a high condition so that the power source regeneration period transfers to the commutation period. The output terminal Q of each of the $FF_1$ and $FF_2$ takes a low condition when the FF is reset. Therefore, the output terminal Q of the reset $FF_2$ turns from the high condition into the low condition to change the transistor $Q_3$ from the turned-off condition to a turned-on condition. At this time, the transistor $Q_1$ remains as it was turned off. If the transistor $Q_3$ is brought into the turned-on condition when the regeneration current is flowing through the inductive load $L_A$, the flywheel diode $D_2$ is reversely biased. Thereby, the direction of the regeneration current having flowing from the ground potential side to the power source E is changed so that a commutation current flows in a closed path formed by the inductive load $L_A$, the transistor $Q_3$, the current detecting resistor $R_{SA}$ and the flywheel diode $D_4$.

At this time, an energy stored in the inductive load $L_A$ is only released through the consumption thereof as the generation of heat by the commutation current. Since the attenuation of the energy is gentle, the rate of decrease of the current flowing through the inductive load $L_A$ is also gentle.

On the other hand, the control circuit $3_B$ for driving the B-phase inductive load $L_B$ is also inputted with the above-mentioned rectangular waves 22 and 24, and the compulsory turn-on period, the power source regeneration period and the commutation period of the control circuit $3_B$ coincide with those of the control circuit $3_A$.

Consider the case where the current $I_{LB}$ flowing through the B-phase inductive load $L_B$ reaches the upper limit current $IREF_B$ at the point P22 in the commutation period so that the output of the $COMP_1$ in the control circuit $3_B$ is inverted from a low condition to a high condition and the high output is provided to the set terminals S of the $FF_1$ and $FF_2$ in the control circuit $3_B$. Then, since the reset terminal R of the $FF_1$ is in a low condition, the output terminal Q thereof turns from a low condition into a high condition at that point of time. On the other hand, since the reset terminal R of the $FF_2$ is in a high condition or the $FF_2$ has been reset, the output terminal Q of the $FF_2$ maintains the low condition.

Accordingly, the transistor $Q_1$ in the H-bridge circuit $4_B$ turns from the turned-on condition into a turned-off condition and the transistor $Q_3$ therein maintains the turned-on condition, so that the transfer to a commutation operation is made with no power source regeneration operation being performed.

When the rectangular wave 22 turns into a high condition as the result of the completion of one driving period T while the commutation operation is being performed for both the A and B phases, the $FF_1$ is also reset so that the output terminal Q thereof takes a low condition. At that point of time P14 or P24, the transistors $Q_1$ in the H-bridge circuits $4_A$ and $4_B$ are simultaneously brought into turned-on conditions. With the turned-on transistors $Q_1$ and the transistors $Q_3$ having maintained the turned-on conditions, both the A-phase and B-phase H-bridge circuits $4_A$ and $4_B$ transfer to their current supply operations so that currents begin to be supplied from the power source E to the inductive loads $L_A$ and $L_B$.

Thus, after the lapse of the compulsory turned-on period from the transfer to the current supply operation, the A-phase and B-phase H-bridge circuits $4_A$ and $4_B$ is subjected to the transfer to the power source regeneration operation or the commutation operation. FIG. 3 shows that after a current supply operation is performed again, the current $I_{LA}$ flowing through the A-phase inductive load $L_A$ reaches the upper limit current $IREF_A$ at a point $P_{15}$ after the lapse of a forced turn-on period so that the transfer to a power source regeneration operation is made at that time. On the other hand, the current $I_{LB}$ flowing through the B-phase inductive load $L_B$ already exceeds the upper limit current $IREF_B$ value at a point of time before the completion of a forced turn-on period and hence the transfer to a power source regeneration operation is made immediately at the point of time of the completion of the forced turn-on period.

As explained in the foregoing, the start of a current supply operation for the A-phase inductive load $L_A$ and the start of a current supply operation for the B-phase inductive load $L_B$ are determined by the time constant of one series circuit of the timing resistor $R_T$ and the timing condenser $C_T$ and one timing signal generating circuit 7 and are therefore simultaneous with each other. Accordingly, there is no fear that the timings of start of both the current supply operations deviate from each other. As a result, there is no fear that noises or vibrations caused by beats are generated.

The above-mentioned series of operations concern the case where currents flown to the inductive loads $L_A$ and $L_B$ are switched to keep the values thereof constant. In the inductive load driving apparatus 2, however, the amplitudes of switching currents flown to the inductive loads $L_A$ and $L_B$ can be changed by changing the output voltages of the reference power sources $VREF_1$ and $VREF_2$ for current comparison in the control circuits $3_A$ and $3_B$.

Figure 4:
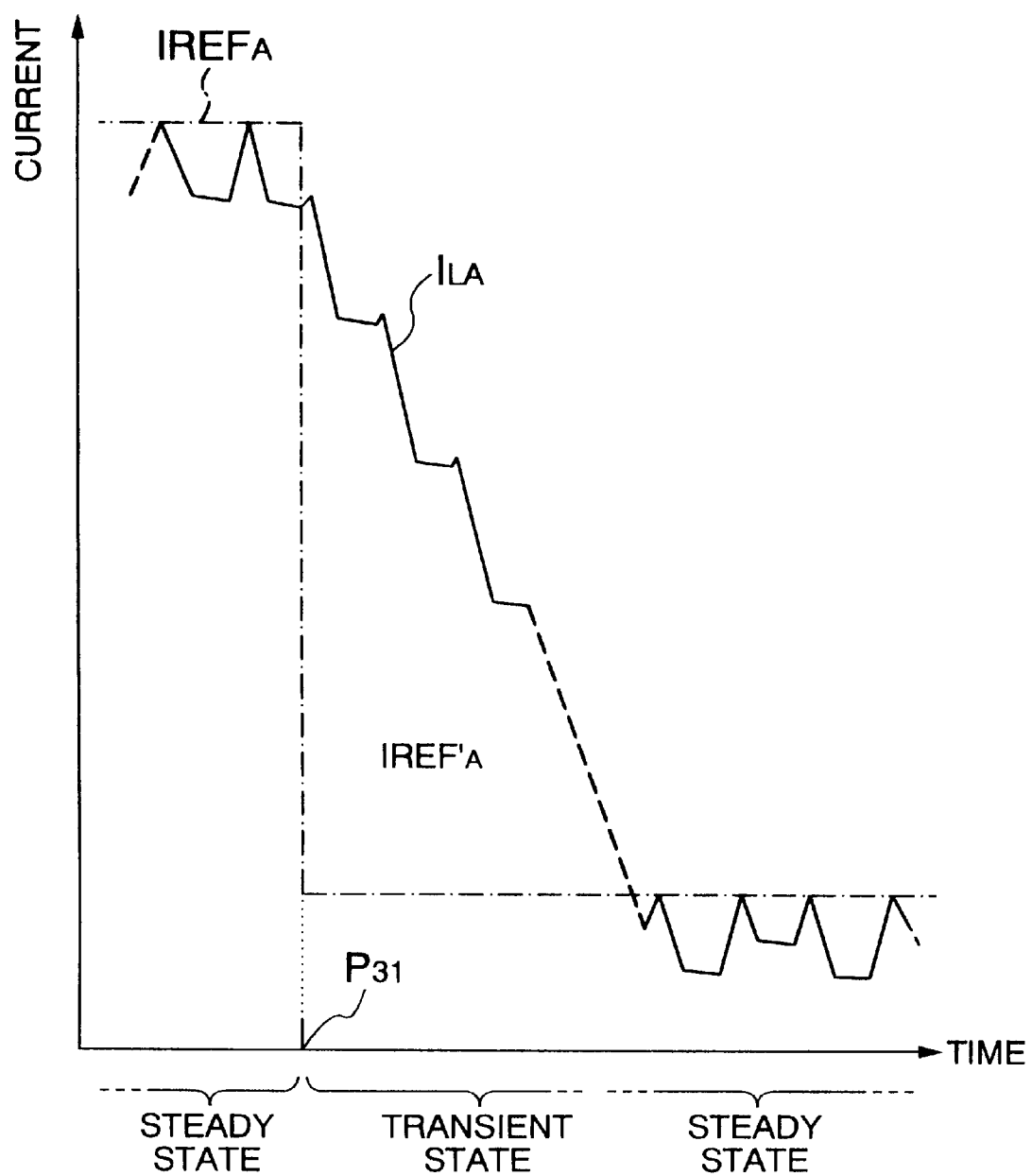
FIG. 4 is a diagram for explaining the operation in the case where a switching current flowing through an inductive load is reduced.
Figure 5:
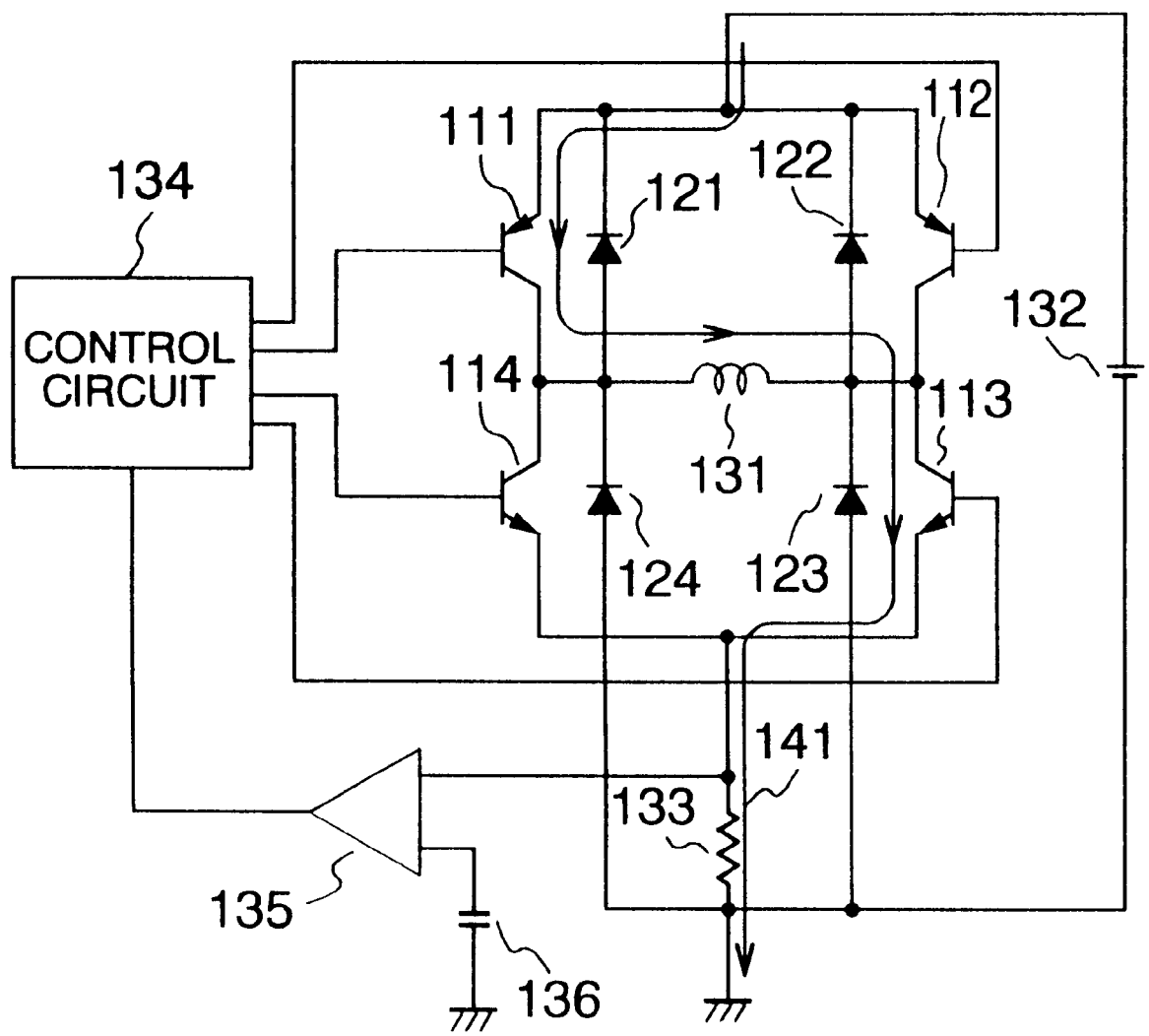
FIG. 5 is a diagram showing the block of the whole of an inductive load driving apparatus according to the prior art.
Figure 6A:
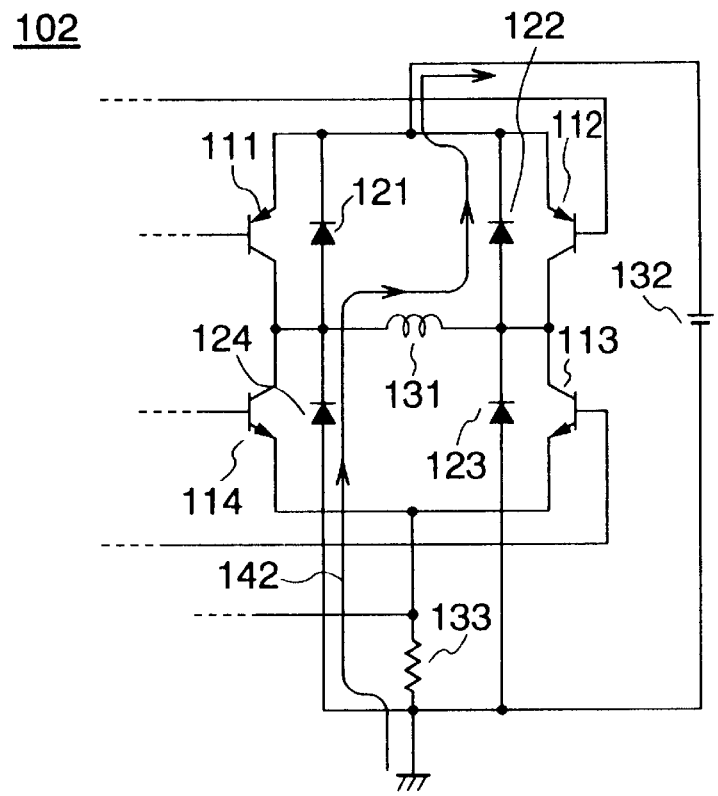
FIG. 6A is a diagram for explaining a path for a regeneration current flowing through an H-bridge circuit of the inductive load driving apparatus of the prior art.
Figure 6B:
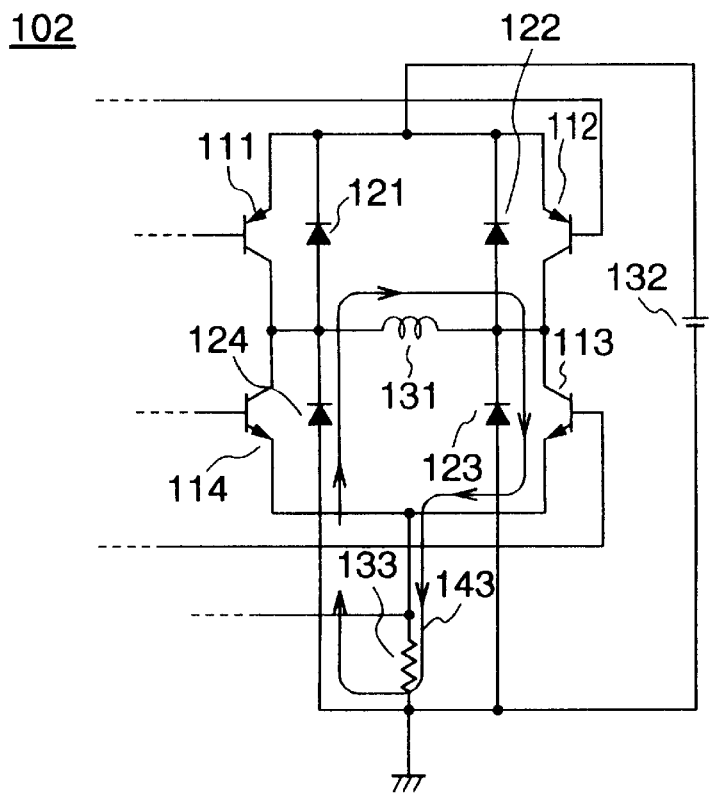
FIG. 6B is a diagram for explaining a path for a commutation current flowing through the H-bridge circuit.

The change of the flown switching current will be explained in FIG. 4 with the A-phase inductive load $L_A$ taken as an example. Herein, it is assumed that from a steady state in which a constant level of the current $IREF_A$ is maintained, the switching current flowing through the inductive load $L_A$ is changed to $IREF'_A$ at a point P31 of time by reducing the output voltage of the reference power source $VREF_1$ for current comparison.

Each of the current levels $IREF_A$ and $IREF'_A$ is a current value with which the output of the $COMP_1$ in the control circuit $3_A$ is inverted. Assume that at a point of time of completion of a compulsory turn-on period, a current flowing through the inductive load $L_A$ has already exceeded $IREF'_A$ and the $COMP_1$ has taken a high condition. At the point of time of completion of the forced turn-on period, the transfer to a power source regeneration operation is immediately made. When there turns into a commutation period, the transfer from the power source regeneration operation to a commutation operation is made.

In the case where there transfers from that state to a current supply operation, it is general that the current $I_{LA}$ flowing through the inductive load $L_A$ remains over $IREF'_A$ and hence the transfer to the power source regeneration operation is made immediately after the completion of a compulsory turn-on period.

The above operation is repeated until the current $I_{LA}$ flowing through the inductive load $L_A$ at the point of time of completion of a compulsory turn-on period is below $IREF'_A$.

Even in such a transient state, a current is supplied from the power source E. This is made for causing the flow of a current through the current detecting resistor $R_{SA}$ to detect the amplitude of the current $I_{LA}$ through the inductive load $L_A$ so that the return to a steady state is immediately made when the current $L_{LA}$ is below the current $IREF'_A$ which is a reference current.

Also in this transient state, the driving period T follows the oscillating period of the sawtooth wave 21 as in the steady state with no difference between the transient state and the steady state. The operations for the A and B phases are synchronous with each other so that a current supply operation, a power source regeneration operation and a commutation operation for the A phase are started simultaneously with those for the B phase, respectively.

On the other hand, in the transient operation, the transfer to the power source regeneration operation is made immediately after the completion of the compulsory turn-on period, unlike the steady state. Therefore, a period of time in one driving period T when the power source regeneration operation is performed is long as compared with that in the steady state. Accordingly, the current $I_{LA}$ flowing through the inductive load $L_A$ rapidly attenuates, thereby enabling the quick arrival to the intended current $IREF'_A$.

In the above-mentioned inductive load driving apparatus 2, bi-polar transistors are used as the semiconductor switching elements. However, insulated gate transistors (MOSFET's) may be used. The flywheel diodes may include various rectifying elements such as pn junction diodes, Schottky diodes or the like.

Though the above-mentioned inductive load driving apparatus 2 has an IC structure, the present invention may include a multi-chip module having the transistors $Q_1$ to Q4 and the flywheel diodes $D_1$ to $D_4$ as single chips and a hybrid IC.

Inversely, a structure having the timing resistor $R_T$ and the current detecting resistor $R_S$ incorporated therein may also be included in the present invention.

Since a power source regeneration operation and a commutation operation can be performed in a well-balanced manner, a high-frequency driving can be performed with a switching current having a small ripple.

Even if a plurality of inductive loads are driven, there is no fear that noises or vibrations caused by beats are generated.

When a switching current level flown to an inductive load is to be reduced, the reduction can be made quickly.

We claim:

1. An inductive load driving method for controlling a current flowing through an inductive load, said current being supplied in both forward and reverse directions by an H-bridge circuit including four semiconductor switching elements and flywheel diodes respectively connected to said semiconductor switching elements, said inductive load driving method comprising at least two of:

a current supplying step of turning two of said semiconductor switching elements on so as to supply a current from a power source to said inductive load;

a commutation step of turning one of said semiconductor switching elements on so that energy stored in said inductive load causes a current flowing through said one of said semiconductor switching elements and one of said flywheel diodes; and a power source regeneration step of turning all of said semiconductor switching elements off so that energy stored in said inductive load causes a current flowing through two of said flywheel diodes;

wherein said inductive load driving method further comprises the step of generating a timing signal having a predetermined frequency and indicative of a driving period to (i) start said current supplying step in accordance with a start of said driving period and stop said current supplying step when an amplitude of the current flowing though said inductive load becomes a predetermined value or more, (ii) start said power source regeneration step when said current supplying step is stopped before a predetermined time point and stop said power source regeneration step at said predetermined time period, and (iii) start said commutation step when said current supplying step or said power source regeneration step is stopped and stop said commutation step at an end of said driving period.

2. An inductive load driving method according to claim 1 for controlling currents flowing through a plurality of inductive loads, said currents being supplied by a plurality of H-bridge circuits respectively, wherein said plurality of said H-bridge circuits are driven at the same driving period.

3. An inductive load driving method according to claim 1, wherein said current supplying step is continued in a predetermined period from the start of said driving period irrespective of the amplitude of the current flowing through said inductive load.

4. An inductive load driving method according to claim 2, wherein said current supplying step is continued in a predetermined period from the start of said driving period irrespective of the amplitude of the current flowing through said inductive load.

5. An inductive load driving apparatus comprising:

an H-bridge circuit, including four semiconductor switching elements and flywheel diodes respectively connected to said semiconductor switching elements, for supplying a current in both forward and reverse directions through said inductive load;

a control circuit for controlling said H-bridge circuit to perform at least two of (i) a current supplying operation of turning two of said semiconductor switching elements on so as to supply a current from a power source to said inductive load, (ii) a power source regeneration operation of turning one of said semiconductor switching elements on so that energy stored in said inductive load causes a current flowing through said one of said semiconductor switching elements and one of said flywheel diodes, and (iii) a commutation operation of turning all of said semiconductor switching elements off so that energy stored in said inductive load causes a current flowing through two of said flywheel diodes; and a timing signal generating circuit for generating a timing signal having a predetermined frequency and indicative of a driving period so that said control circuit controls said H-bridge circuit to (i) start said current supplying operation in accordance with a start of said driving period and stop said current supplying operation when an amplitude of the current flowing though said inductive load becomes a predetermined value or more, (ii) start said power source regeneration operation when said current supplying operation is stopped before a predetermined time point and stop said power source regeneration operation at said predetermined time period, and (iii) start said commutation operation when said current supplying operation or said current supplying operation is stopped and stop said commutation operation at an end of said driving period.

6. An inductive load driving apparatus according to claim 5, comprising a plurality of said H-bridge circuits for supplying currents through a plurality of inductive loads respectively, wherein said plurality of said H-bridge circuits are driven at the same driving period.

7. An inductive load driving apparatus according to claim 5, wherein said current supplying operation is continued in a predetermined period from the start of said driving period irrespective of the amplitude of the current flowing through said inductive load.

8. An inductive load driving apparatus according to claim 6, wherein said current supplying operation is continued in a predetermined period from the start of said driving period irrespective of the amplitude of the current flowing through said inductive load.

9. An inductive load driving method for controlling a current flowing through an inductive load, said current being supplied in both forward and reverse directions by an H-bridge circuit including a plurality of switching elements and flywheel diodes respectively connected to said switching elements, said inductive load driving method comprising at least two of:

a current supplying step of turning two of said switching elements on so as to supply a current from a power source to said inductive load;

a commutation step of turning one of said switching elements on so that energy stored in said inductive load causes a current to flow through said one of said switching elements and one of said flywheel diodes; and a power source regeneration step of turning all of said switching elements off so that the energy stored in said inductive load causes a current to flow through two of said flywheel diodes;

wherein said inductive load driving method further comprises generating a timing signal having a predetermined frequency and indicative of a driving period to (i) start said current supplying step in accordance with a start of said driving period and stop said current supplying step when an amplitude of the current flowing through said inductive load becomes a predetermined value or more, (ii) start said power source regeneration step when said current supplying step is stopped before a predetermined time point and stop said power source regeneration step at said predetermined time point, and (iii) start said commutation step when said current supplying step or said power source generation step is stopped and stop said commutation step at an end of said driving period.

10. An inductive load driving method according to claim 9 for controlling currents flowing through a plurality of inductive loads, said currents being supplied by a plurality of H-bridge circuits respectively, wherein said plurality of said H-bridge circuits are driven at the same driving period.

11. An inductive load driving method according to claim 9, wherein said current supplying step is continued in a predetermined period from the start of said driving period irrespective of the amplitude of the current flowing through said inductive load.

12. An inductive load driving method according to claim 10, wherein said current supplying step is continued in a predetermined period from the start of said driving period irrespective of the amplitude of the current flowing through said inductive load.

13. An inductive load driving apparatus comprising:

an H-bridge circuit, including a plurality of switching elements and flywheel diodes respectively connected to said switching elements, for supplying a current in both forward and reverse directions through said inductive load;

a control circuit for controlling said H-bridge circuit to perform at least two of (i) a current supplying operation of turning two of said switching elements on so as to supply a current from a power source to said inductive load, (ii) a power source regeneration operation of turning one of said switching elements on so that energy stored in said inductive load causes a current to flow through said one of said switching elements and one of said flywheel diodes, and (iii) a commutation operation of turning all of said switching elements off so that energy stored in said inductive load causes a current to flow through two of said flywheel diodes; and a timing signal generating circuit for generating a timing signal having a predetermined frequency and indicative of a driving period so that said control circuit controls said H-bridge circuit to (i) start said current supplying operation in accordance with a start of said driving period and stop said current supplying operation when an amplitude of the current flowing though said inductive load becomes a predetermined value or more, (ii) start said power source regeneration operation when said current supplying operation is stopped before a predetermined time point and stop said power source regeneration operation at said predetermined time point, and (iii) start said commutation operation when said current supplying operation or said power source regeneration operation is stopped and stop said commutation operation at an end of said driving period.

14. An inductive load driving apparatus according to claim 13, comprising a plurality of said H-bridge circuits for supplying currents through a plurality of inductive loads respectively, wherein said plurality of said H-bridge circuits are driven at the same driving period.

15. An inductive load driving apparatus according to claim 13, wherein said current supplying operation is continued in a predetermined period from the start of said driving period irrespective of the amplitude of the current flowing through said inductive load.

16. An inductive load driving apparatus according to claim 14, wherein said current supplying operation is continued in a predetermined period from the start of said driving period irrespective of the amplitude of the current flowing through said inductive load.

* * * * *